US010723077B2

(12) United States Patent
Besim et al.

(10) Patent No.: US 10,723,077 B2
(45) Date of Patent: Jul. 28, 2020

(54) SYSTEM TO ENABLE FOLDING IN AN ADDITIVE MANUFACTURING MACHINE

(71) Applicants: Bulent Besim, South Melbourne (AU); Stephen Weatherly, Miami, FL (US)

(72) Inventors: Bulent Besim, South Melbourne (AU); Stephen Weatherly, Miami, FL (US)

(*) Notice: Subject to any disclaimer, the term of this patent is extended or adjusted under 35 U.S.C. 154(b) by 110 days.

(21) Appl. No.: 16/233,138

(22) Filed: Dec. 27, 2018

(65) Prior Publication Data

US 2020/0207023 A1 Jul. 2, 2020

(51) Int. Cl.
*B29C 64/00* (2017.01)
*B29C 64/379* (2017.01)
*B33Y 30/00* (2015.01)
*B29C 64/393* (2017.01)
*B33Y 40/00* (2020.01)
*B33Y 50/02* (2015.01)

(52) U.S. Cl.
CPC .......... *B29C 64/379* (2017.08); *B29C 64/393* (2017.08); *B33Y 30/00* (2014.12); *B33Y 40/00* (2014.12); *B33Y 50/02* (2014.12)

(58) Field of Classification Search
CPC ...................................................... B33Y 30/00
USPC ..... 425/136, 131.1, 130, 375; 264/401, 497, 264/40.7
See application file for complete search history.

(56) References Cited

U.S. PATENT DOCUMENTS

| 6,685,866 B2 * | 2/2004 | Swanson | B29C 64/106 264/308 |
| 2017/0202309 A1 * | 7/2017 | Sterman | A43B 23/028 |
| 2017/0238595 A1 * | 8/2017 | Atureliya | A23P 20/20 |
| 2017/0297320 A1 * | 10/2017 | Swanson | B29C 64/40 |

FOREIGN PATENT DOCUMENTS

| CN | 204505862 U | * | 7/2015 |
| CN | 205800203 U | * | 12/2016 |

OTHER PUBLICATIONS

Machine English Translation CN 205800203U (Year: 2016).*

* cited by examiner

*Primary Examiner* — Nina Bhat

(57) ABSTRACT

A system is provided for rotating a structure to assume a folded position or an upright position. The structure enables movement of a print head of an additive manufacturing machine along a vertical axis. The system comprises a hub and a second member. The hub comprises a first member defining an arched surface and a plurality of notches. The second member is pressed against the first member by a tensioning member. The hub is operable to be rotated to assume the upright position or the folded position of the structure. Rotation of the hub results in at least a portion of the arched surface to slide against the second member, which is enabled by retraction of the second member. The second member is received by one of the plurality of notches to retain the structure in the folded position or the upright position.

13 Claims, 14 Drawing Sheets

SYSTEM TO ENABLE FOLDING IN AN ADDITIVE MANUFACTURING MACHINE

BACKGROUND

Unless otherwise indicated herein, the materials described in this section are not prior art to the claims in this application and are not admitted being prior art by inclusion in this section.

Field of the Invention

The subject matter in general relates to additive manufacturing machines. More particularly, but not exclusively, the subject matter relates to a foldable additive manufacturing machine.

Discussion of the Related Field

Additive manufacturing (commonly referred to as either rapid prototyping or 3D-printing) has come a long way from building prototypes to manufacturing finished products that can be used in day to day life. Be it retail goods, food industry or medical implants, additive manufacturing is rapidly being adopted in several major industries.

Conventionally, additive manufacturing machines are relatively large structures that are not compact in nature. These are very difficult to be moved from one place to another. Even if they were to be moved, the machine occupies considerable space during transport, and may also be subject to damage. Further, manpower or other resources required to move the machine is substantial. Also, conventional additive manufacturing machines cover a lot of floorspace. This is a major problem when the additive manufacturing machines are not in use.

In view of the foregoing discussion, there is a need for an improved system for operably making the additive manufacturing machine relatively compact when not in use or for transportation.

SUMMARY

A system is provided in an additive manufacturing machine for operably rotating a structure, which enables movement of a print head of the additive manufacturing machine along a vertical axis, to assume a folded position or an upright position. The system comprises a hub and a second member. The hub at least partially supports the structure. The hub comprises a first member defining an arched surface and a plurality of notches. The second member is pressed against the first member by a tensioning member. The hub is operable to be rotated to assume the upright position or the folded position of the structure. Rotation of the hub results in at least a portion of the arched surface sliding against the second member, which is enabled by retraction of the second member. The second member is received by one of the plurality of notches to retain the structure in the folded position or the upright position.

BRIEF DESCRIPTION OF DRAWINGS

Embodiments are illustrated by way of example and not limitation in the figures of the accompanying drawings, in which like references indicate similar elements and in which.

DETAILED DESCRIPTION

Figure 1A:
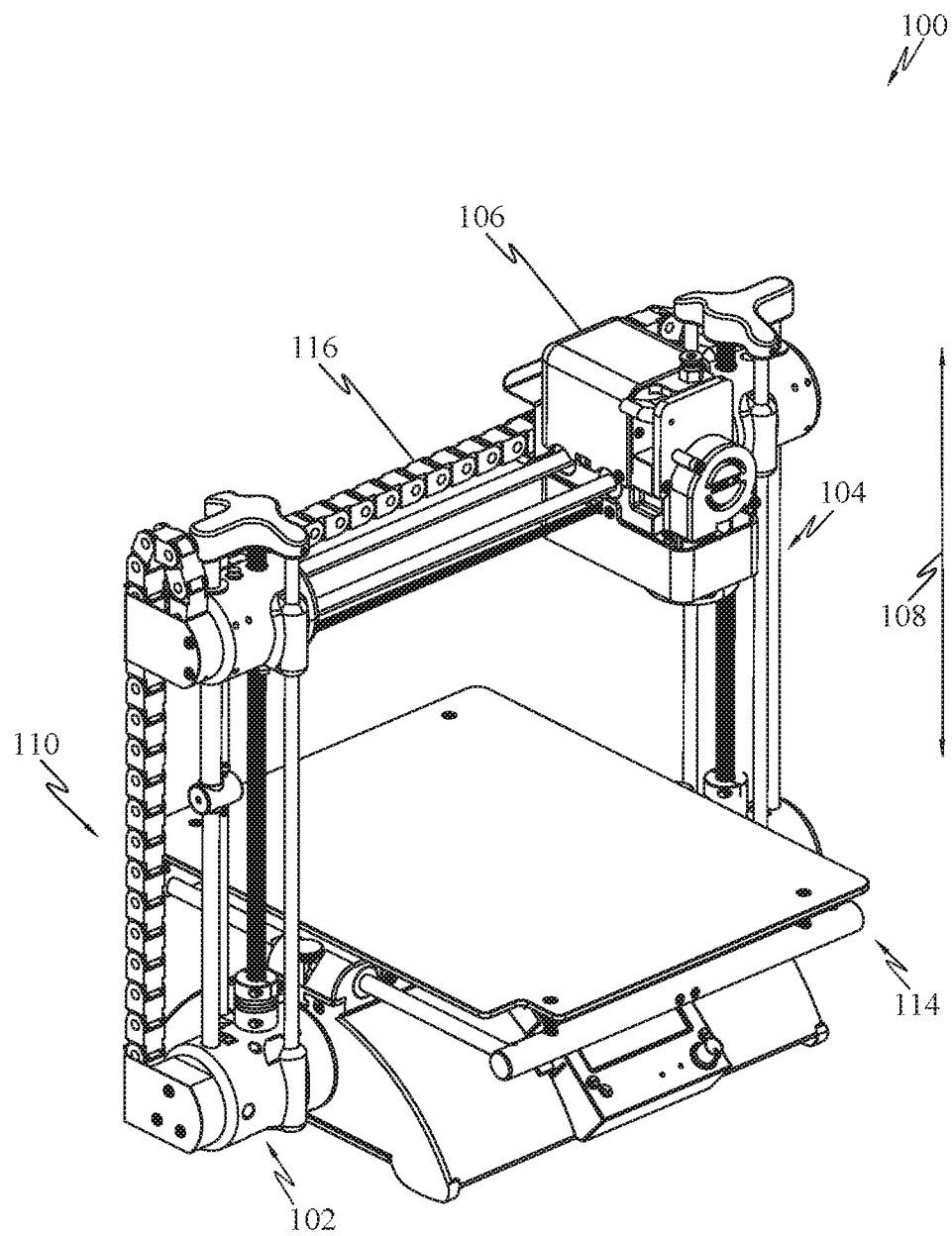
FIG. 1A illustrates a system 102 for rotating a structure 104 to assume an upright position 110, relative to a base 114 of an additive manufacturing machine 100, in accordance with an embodiment.

The following detailed description includes references to the accompanying drawings, which form a part of the detailed description. The drawings show illustrations in accordance with example embodiments. These example embodiments, which may be herein also referred to as "examples" are described in enough detail to enable those skilled in the art to practice the present subject matter. However, it may be apparent to one with ordinary skill in the art, that the present invention may be practised without these specific details. In other instances, well-known methods, procedures and components have not been described in detail so as not to unnecessarily obscure aspects of the embodiments. The embodiments can be combined, other embodiments can be utilized, or structural, logical, and design changes can be made without departing from the scope of the claims. The following detailed description is, therefore, not to be taken in a limiting sense, and the scope is defined by the appended claims and their equivalents.

In this document, the terms "a" or "an" are used, as is common in patent documents, to include one or more than one. In this document, the term "or" is used to refer to a nonexclusive "or," such that "A or B" includes "A but not B," "B but not A," and "A and B," unless otherwise indicated.

Referring to figures, an additive manufacturing machine 100 is provided with a system 102 for rotating a structure 104, relative to base 114 of the additive manufacturing machine 100. The structure 104 enables movement of a print head 106 along a vertical axis 108. The rotation may result in the structure 104 assuming a folded position 112 or an upright position 110. The system 100 may include a hub 202 and a second member 210, wherein the hub 202 supports the structure 104. The hub 202 comprises a first member 204, wherein the first member 204 defines an arched surface 206 and a plurality of notches 208. In an embodiment, two successive notches 208 may be separated by 90 degrees. The first member 204 is received by a first through hole 230 defined by a support plate 222. The support plate 222 further defines at least one groove 232 extending from circumference of the first through hole 230. The groove 232 accommodates the second member 210 and a tensioning member 214. The second member 210 is pressed against the first member 204 using the tensioning member 214. In an embodiment, the structure 104 may be in the upright position 110 when the second member 210 is received by the first notch 208a (refer FIG. 3A). As the hub 202 is rotated, the first member 204 rotates within the first through hole 230 defined by the support plate 222 and with it rotates the first notch 208a. This rotation of the notch 208a pushes the second member 210 up within the groove 232. This movement of the second member 210 is facilitated by the contraction (refer FIG. 3B) of the tensioning member 214. As the second member 210 is received by the notch 208b (wherein the notch 208b is 90 degrees apart from the notch 208a), the structure assumes the folded position 112 (refer FIG. 3C).

System for Rotating a Structure that Enables Movement of Print Head Along a Vertical Axis Referring to FIGS. 1A, 1B and 2A-2C, a system 102 is provided for rotating the structure 104, relative to the base 114 of the additive manufacturing machine 100. In an embodiment, the structure 104 may correspond to vertical screw rod(s) and vertical support rod(s) that may facilitate the movement of the print head 106 along a vertical axis 108. The system 102 facilitates the structure 104 to be rotated for it to assume a folded position 112 or an upright position 110.

The system 102 comprises a hub 202, a second member 210, a support plate 222, a block 212, a tensioning member 214, a locking knob 224 and a connecting member 234. The hub 202 may be configured to support the structure 104, i.e., the hub 202 may be configured to receive the vertical screw rod(s) and vertical support rod(s) of the additive manufacturing machine 100. In an embodiment, the hub 202 may enclose a motor configured to rotate the screw rod(s) to adjust the vertical distance between the print head 106 and base 114 of the additive manufacturing machine 100. The motor may be configured to rotate along with the hub 202.

Figure 1B:
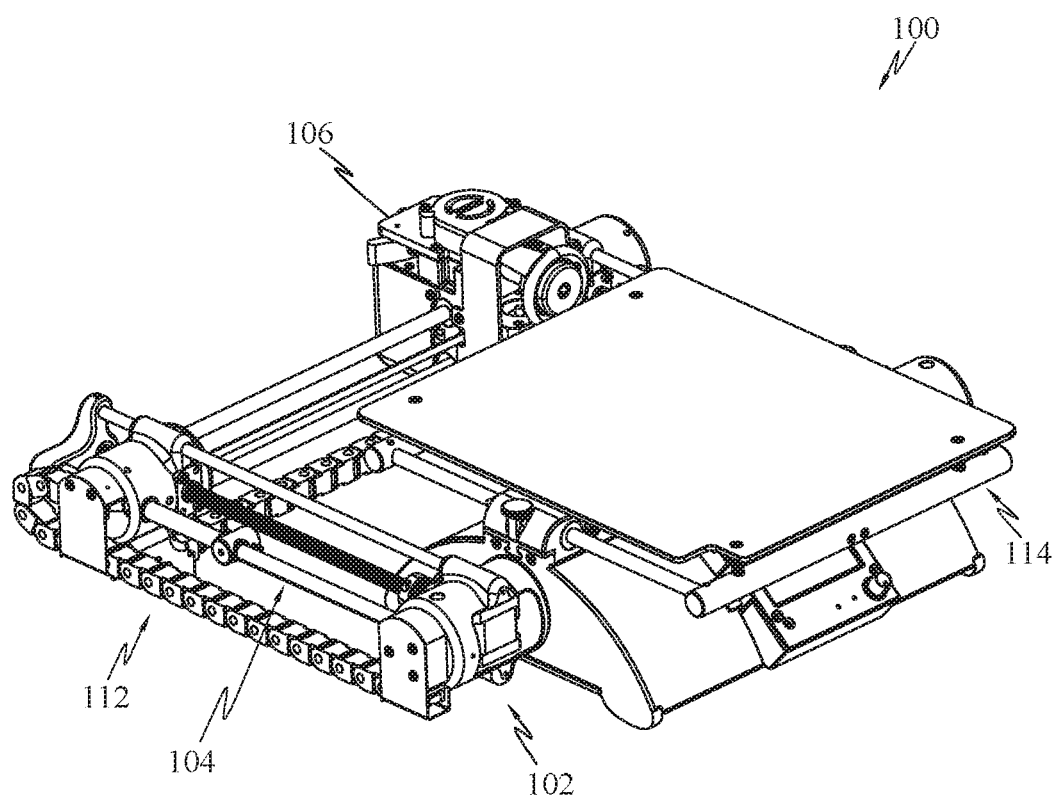
FIG. 1B illustrates a system 102 for rotating a structure 104 to assume a folded position 112, relative to a base 114 of an additive manufacturing machine 100, in accordance with an embodiment.
Figure 2A:
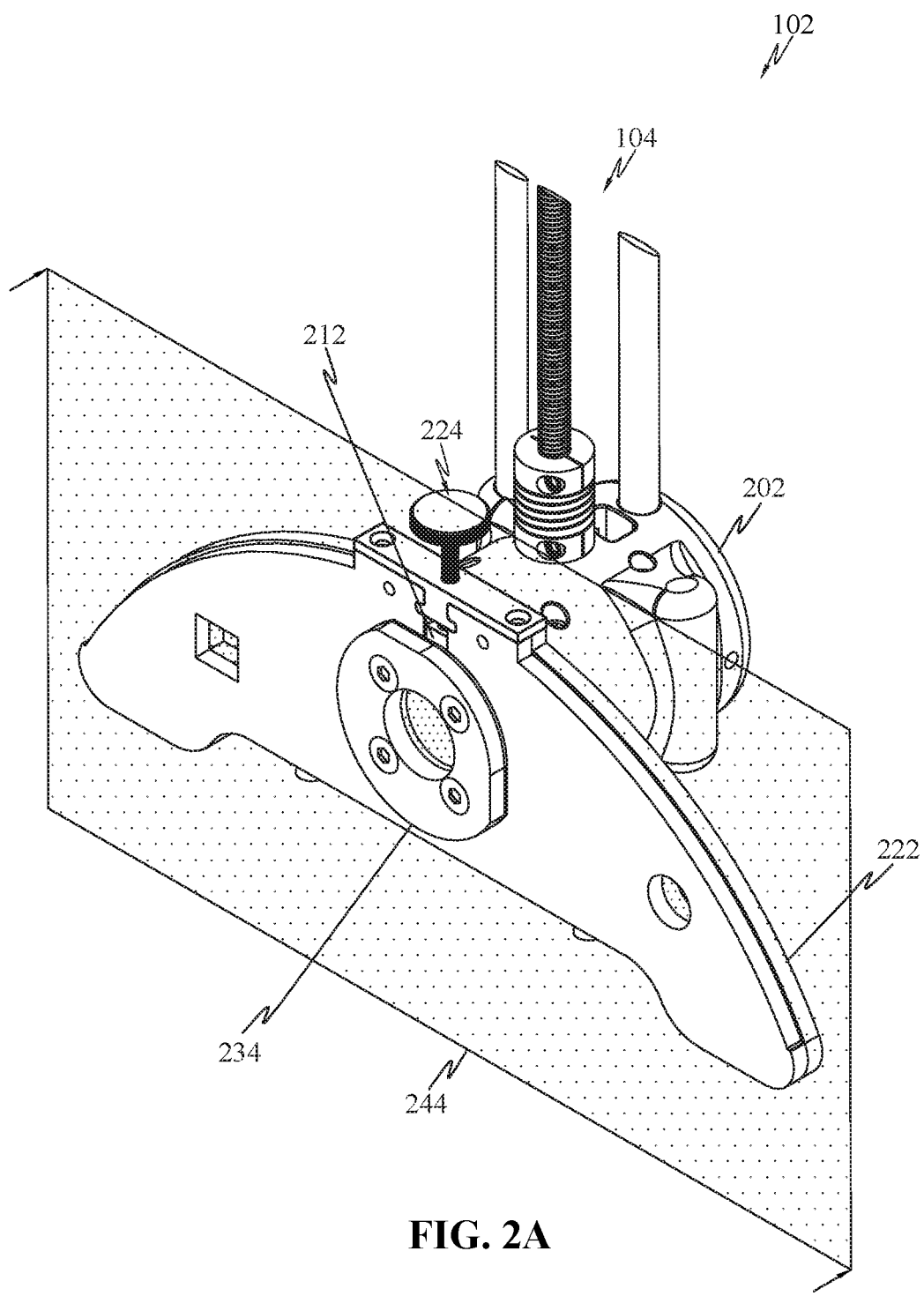
FIG. 2A is an isometric view of the system 102, in accordance with an embodiment.
Figure 2B:
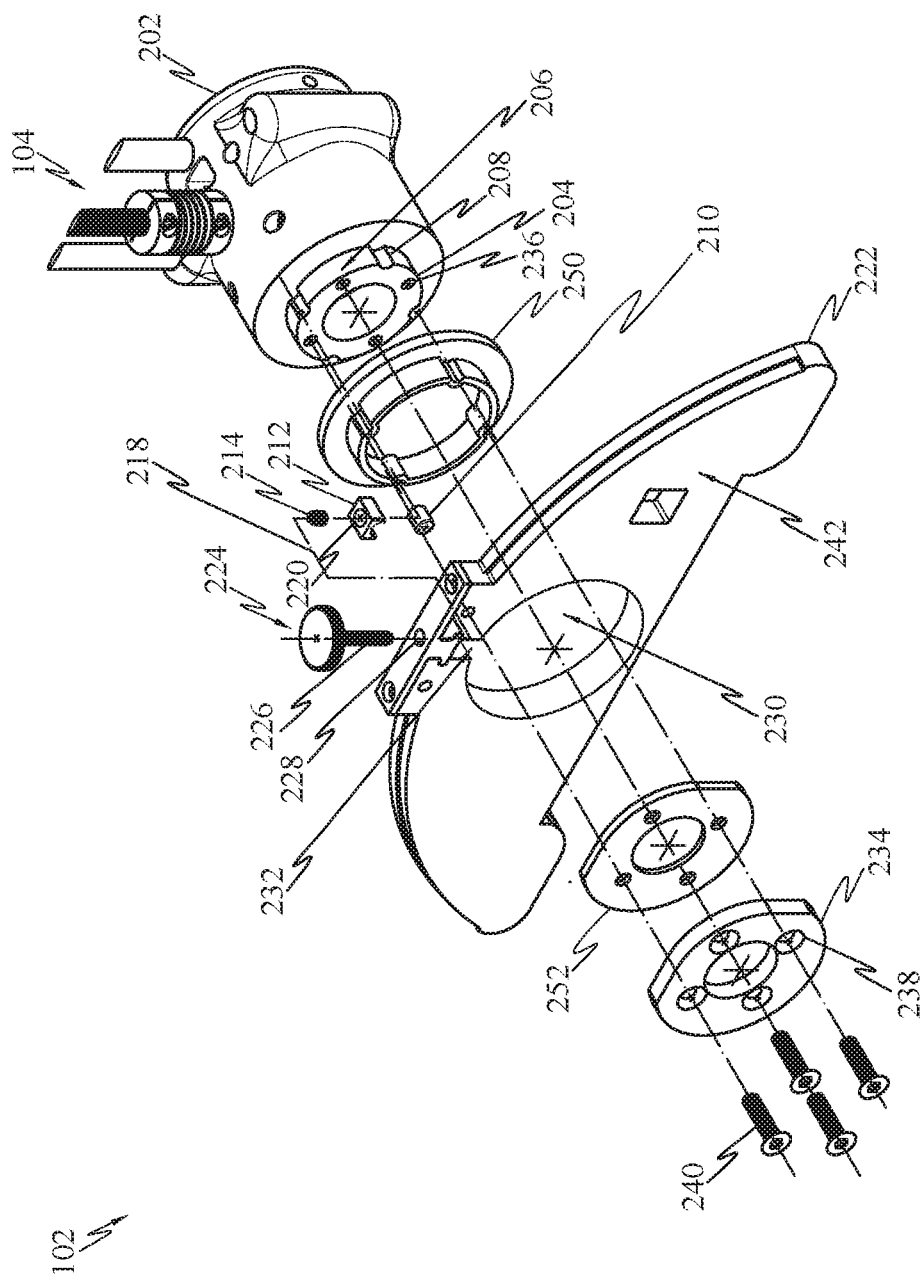
FIG. 2B is an exploded view of the system 102, in accordance with an embodiment.
Figure 2C:
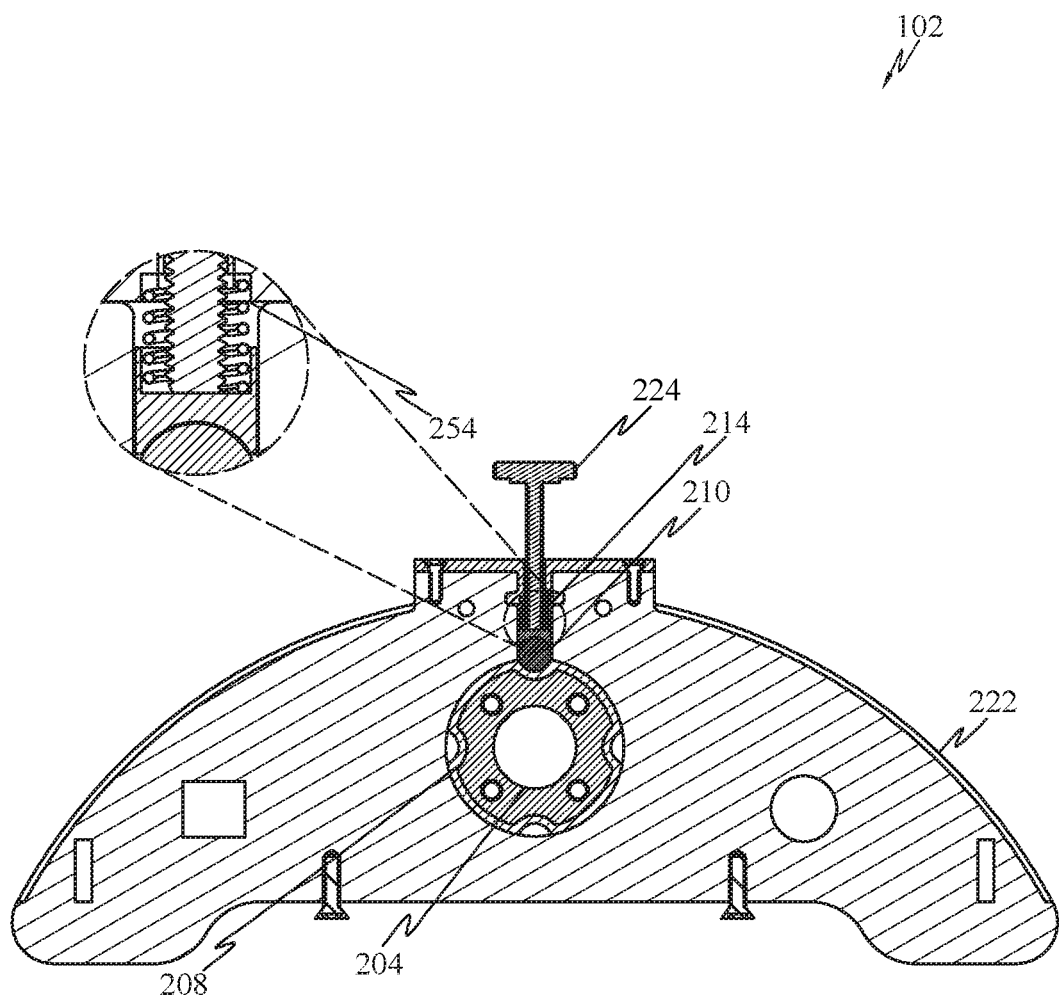
FIG. 2C is a section view of the system 102, in accordance with an embodiment.

In an embodiment, a pair of hubs 202 may be disposed on opposite sides of the base 114 of the additive manufacturing machine 100 (as shown in FIGS. 1A and 1B).

In an embodiment, the hub 202 may comprise a first member 204. The first member 204 may be a protrusion extending from one end of the hub 202. The first member 204 may define an arched surface 206 and a plurality of notches 208 along the arched surface 206.

In an embodiment, two successive notches 208 may be separated by over 45 degrees. In yet another embodiment, two successive notches 208 may be separated by over 45 degrees and under 120 degrees.

The second member 210 may be configured to be pressed against the first member 204 using the tensioning member 214. In an embodiment, the second member 210 may be cylindrical or spherical in shape. In an embodiment, the tensioning member 214 may be a spring 214.

In an embodiment, the support plate 222 may define a first through hole 230, configured to receive the first member 204. In an embodiment, the first member 204 may rotate within the first through hole 230. In an embodiment, the support plate 222 may be stationary relative to the hub 202. Further, the support plate 222 may define at least one groove 232, wherein the groove 232 may extend from circumference of the first through hole 230.

In an embodiment, the groove 232 may be configured to receive the second member 210. The second member 210 may be placed within the groove 232 such that the second member 210 traverses up and down along the length of the groove 232.

Further, the groove 232 may also accommodate the block 212, wherein the block 212 may define a hole 220 to accommodate the tensioning member 214. The side of the block 212, opposing the side defining the hole 220, may be arched and may be in contact with the second member 210.

In an embodiment, the support plate 222 may accommodate the locking knob 224. The support plate 222 may define a second through hole 228 (or a threaded hole 228) such that the second through hole 228 is exposed to the groove 232. At least a partially threaded shank portion 226 of the locking knob 224, that may pass through the second through hole 228, may be in physical contact with the hole 220 defined by the block 212 such that said shank is surrounded by the tensioning member 214.

In an embodiment, the through hole 228 may be counterbored at end 254 that is in close proximity with the block 212. One end of the tensioning member 214 may be accommodated within the counterbore defined by the through hole 228 and other end of the tensioning member 214 may be accommodated within the hole 220.

In an embodiment, the locking knob 224 may be configured to calibrate the amount of force that may be exerted on the tensioning member 214 and in turn calibrate the force with which the second member 210 may be held in place, between the first member 204 and the block 212, within the groove 232.

In an embodiment, the locking knob 224 may be configured to lock the rotating of the hub 202. The locking knob 224 may be loosened to let the hub 202 rotate, for the structure 104 to assume a folded position 112. Once the structure is in folded 112 or upright position 110, the locking knob 224 may be tightened to lock the structure 104 in the folded position 112 or the upright position 110. Tightening or loosening of the locking knob 224 may exert or relax force applied on the tensioning member 214 and the block 212.

In an embodiment, the hub 202 may be attached to the support plate 222 using the connecting member 234. The connecting member 234 may be placed on a side 242 of the support plate 222 that may be opposite to side to which the hub 202 may be attached to. The first member 204 may define a plurality of holes 236 on surface that is adjacent to the arched surface 206. The connecting member 234 may define a plurality of through holes 238 such that the longitudinal axis of the plurality of through holes 238 are in line with the holes 236 defined by the first member 204. In an embodiment, the hub 202 and the connecting member 238 may be attached to each other using a plurality of screws 240.

In an embodiment, a sleeve 250 may be in contact with the first member 204 such that the sleeve 250 sits on the arched surface 206 of the first member 204. The sleeve 250 may define a plurality of notches (that may be similar to the plurality of notches 208 defined on the arched surface 206 of the first member 204), wherein the plurality of notches may receive the second member 210. The sleeve 250, along with the first member 204, may be received by the first through hole 230. Further, a shim 252 may be placed between the connecting member 234 and the support plate 222. The sleeve 250 and the shim may reduce friction, wear and tear, and may maintain tight tolerance between movable parts. Also, no lubrication may be needed by the use of the sleeve 250 and the shim 252.

In an embodiment, a cable drag chain 116 (shown in FIG. 1A) may be used to house the wiring of the additive manufacturing machine 100.

Figure 3A:
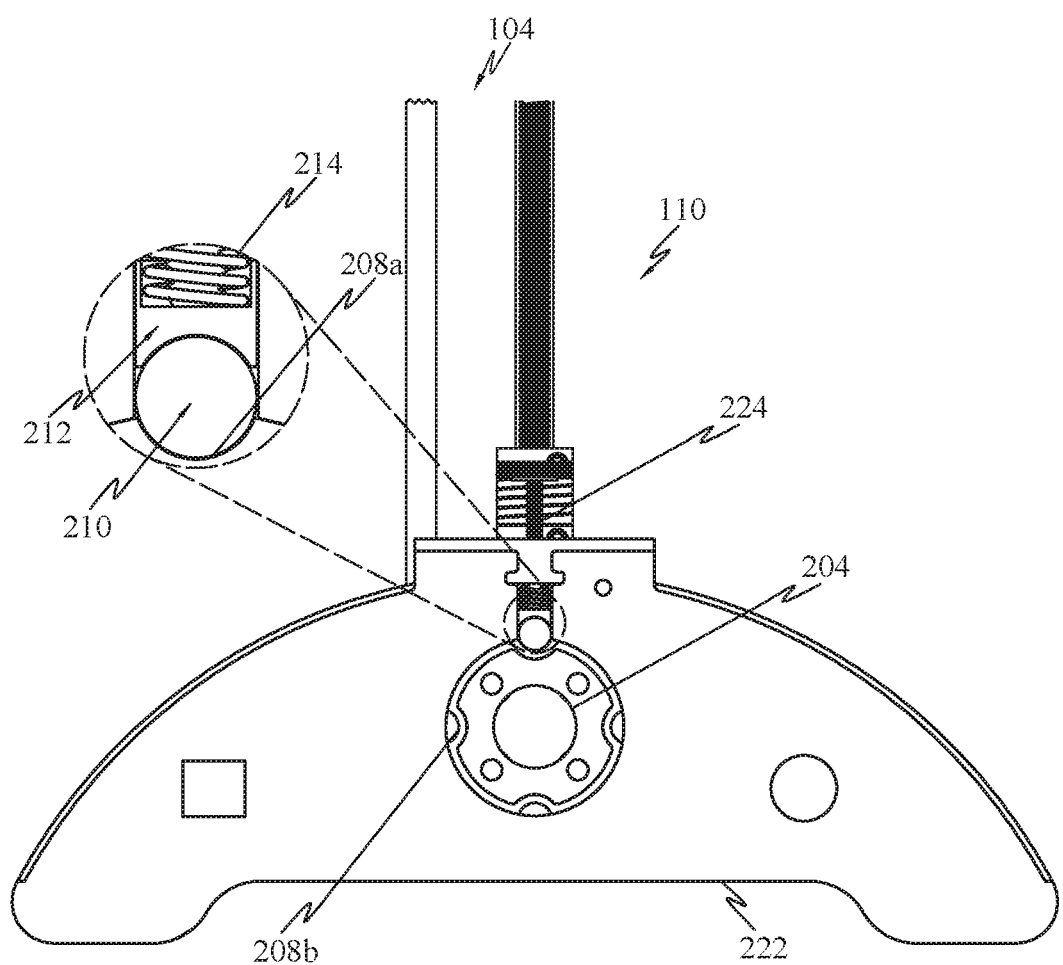
FIG. 3A illustrates rotation of the structure 104, which is in the upright position 110, for it to assume the folded position 112, in accordance with an embodiment.
Figure 3B:
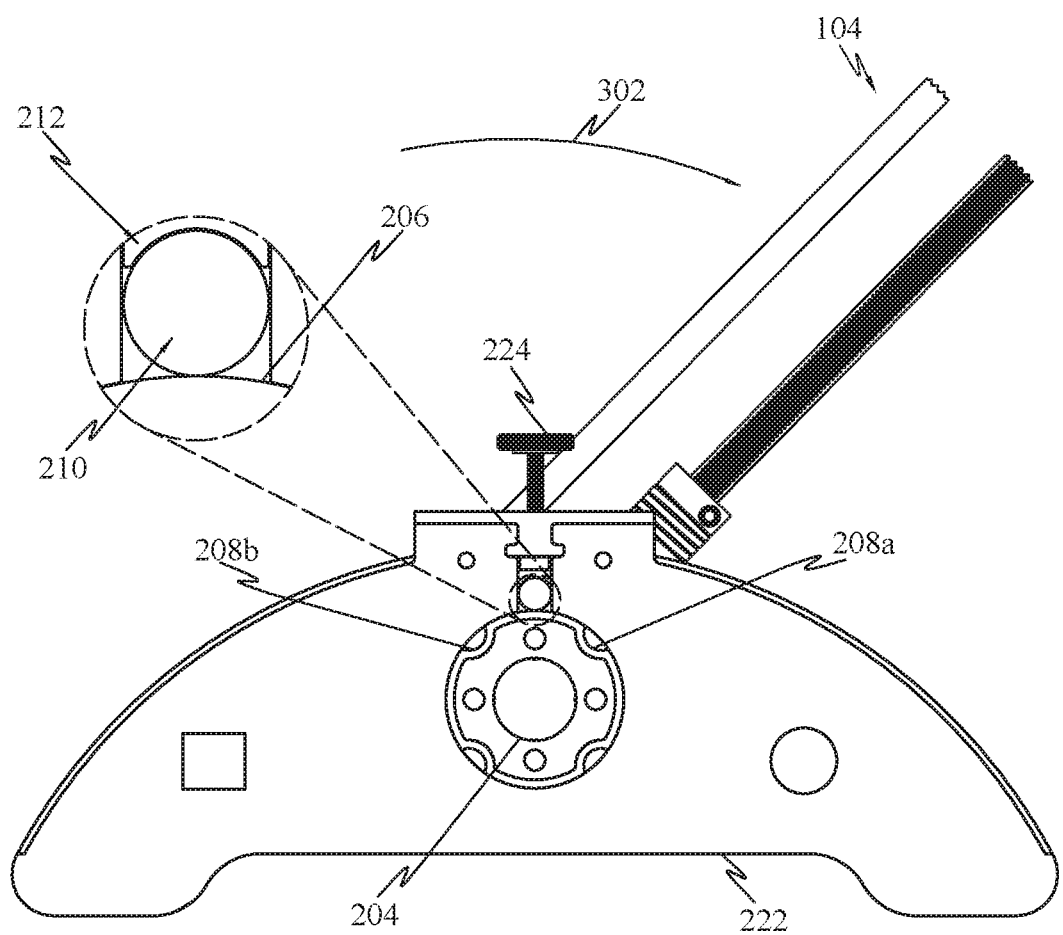
FIG. 3B illustrates the structure 104 in an intermediate position while being rotated to assume the folded position 112, in accordance with an embodiment.
Figure 3C:
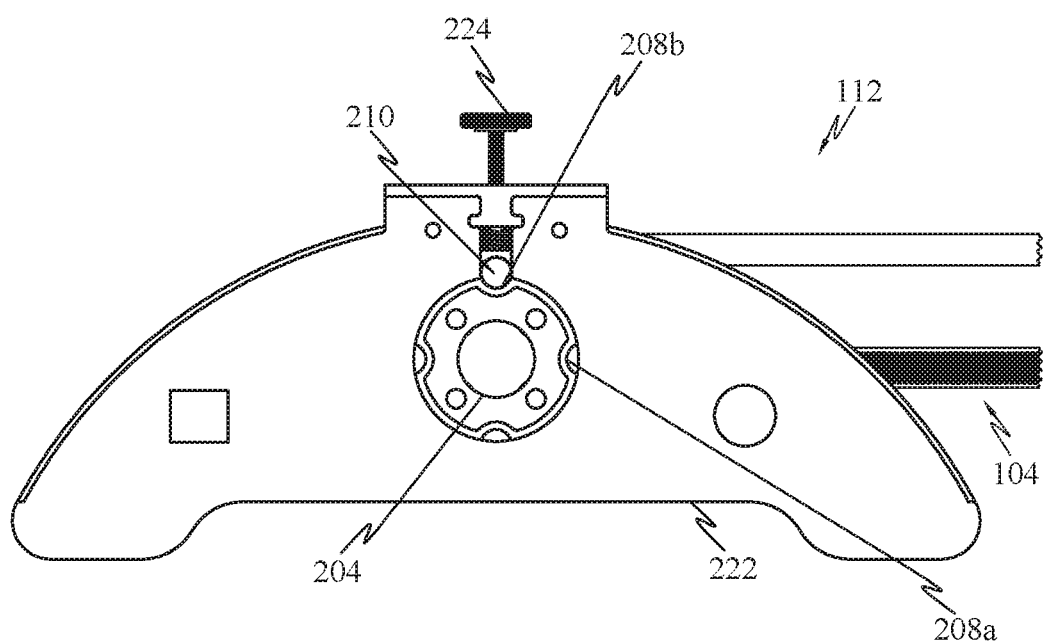
FIG. 3C illustrates the structure in the folded position 112, in accordance with an embodiment.

FIGS. 3A, 3B and 3C illustrate rotation of the structure 104 for it to assume the folded position 112 or the upright position 110. Referring specifically to FIG. 3A, the second member 210 may be placed within the notch 208a. At this point, the structure 104 may be in an upright position 110.

Now referring to FIG. 3B, the hub 202 comprising the first member 204, may be rotated in clockwise direction 302 for the structure 104 to assume a folded position 112 (shown in FIG. 3C). As the hub 202 is being rotated, the first member 204 located within the first through hole 230 rotates. Consequently, the notch 208a defined along the arched surface 206 of the first member 204 rotates, and in the process pushes the second member 210 out of the notch 208a along the length of the groove 232 defined by the support plate 222. As a result, the second member 210 comes in contact with the arched surface 206 of the first member 204. This movement of the second member 210 is facilitated by the tensioning member 214. The tensioning member 214 contracts when the arched surface 206 slides against the second member 210.

Referring to FIG. 3C, the hub 202 is rotated until the desired position of the structure 104 is obtained. In the instant embodiment, the hub 202 is rotated by 90 degrees for the structure 104 to attain a folded position 112. That is, the hub 202 is rotated until the second member 210 is received by the notch 208b. In the instant embodiment, the notch 208a and the notch 208b are separated by 90 degrees.

Figure 4A:
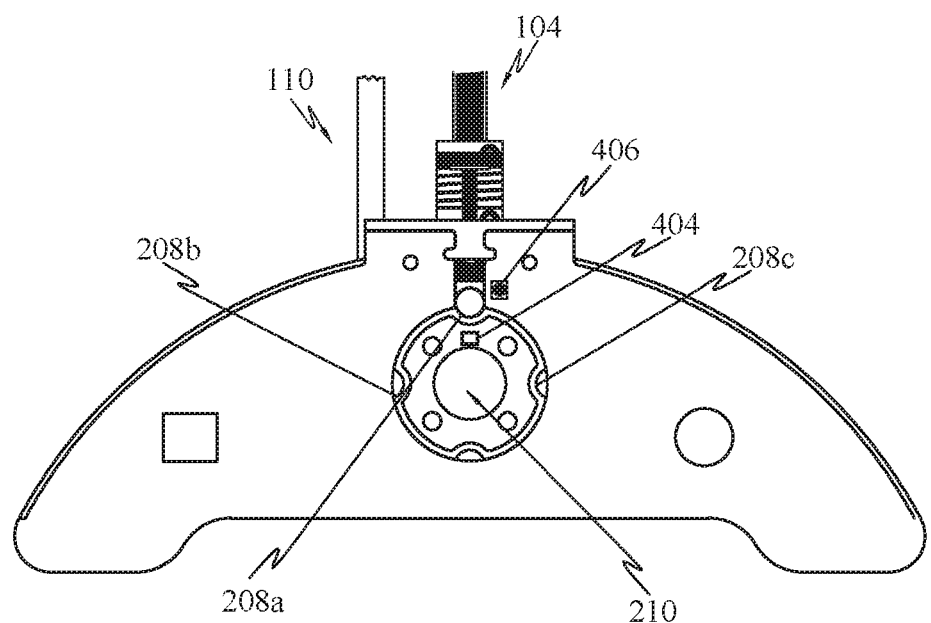
FIG. 4A illustrates a hall effect sensor 406 to sense whether the structure 104 is in the folded position 112 or the upright position 110, in accordance with an embodiment.
Figure 4B:
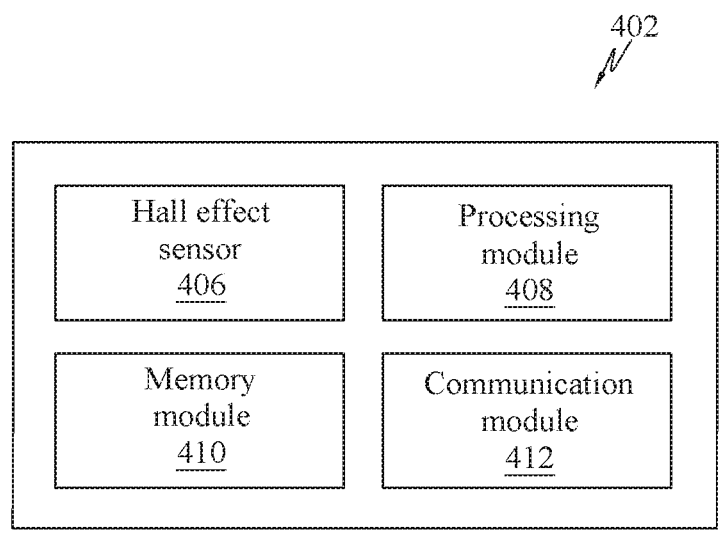
FIG. 4B illustrates a block diagram of a sensor system 402, in accordance with an embodiment.

FIGS. 4A and 4B illustrate a sensor system 402 to sense whether the structure 104 is in the folded position 112 or the upright position 110, in accordance with an embodiment. The sensor system 402 may comprise a magnet 404, a hall effect sensor 406, a processing module 408, a memory module 410 and a communication module 412.

In an embodiment, the processing module 408 is implemented in the form of one or more processors and may be implemented as appropriate in hardware, computer-executable instructions, firmware, or combinations thereof. Computer-executable instruction or firmware implementations of the processing module 408 may include computer-executable or machine-executable instructions written in any suitable programming language to perform the various functions described.

The memory module 410 may include a permanent memory such as hard disk drive, may be configured to store data, and executable program instructions that are implemented by the processing module 408. The memory module 410 may be implemented in the form of a primary and a secondary memory. The memory module 410 may store additional data and program instructions that are loadable and executable on the processing module 408, as well as data generated during the execution of these programs. Further, the memory module 410 may be volatile memory, such as random-access memory and/or a disk drive, or non-volatile memory. The memory module 410 may comprise of removable memory such as a Compact Flash card, Memory Stick, Smart Media, Multimedia Card, Secure Digital memory, or any other memory storage that exists currently or may exist in the future.

The communication module 412 may provide an interface between the various modules of the sensor system 402 and the motor. The communication module 412 may include devices supporting both wired and wireless protocols. Data in the form of electronic, electromagnetic, optical, among other signals may be transferred via communication module 412.

In an embodiment, the hall effect sensor 406 may be positioned close to the groove 232 within which the second member 210 is positioned. The magnet 404 is positioned close to the notch 208a, which when receives the second member 210 keeps the structure 104 in the upright position 110. As the second member 210 is placed within the notch 208a, the magnet 404 is detected by the hall effect sensor 406. The resulting effect may be communicated to the processing module 408. The processing module 408 may in turn communicate the same to the motor using the communication module 412. In an embodiment, the processing module 408 may power up the motor.

In an embodiment, as the structure 104 is rotated, the notch 208a rotates and the second member 210 is placed within the notch 208b. Since the notch 208b has no magnet present within a predetermined proximity, the hall sensor 406 may not be activated. The resulting effect may be communicated to the processing module 408. The processing module 408 may in turn communicate the same to the motor using the communication module 412. In an embodiment, the processing module 408 may prevent operation of the motor.

Figure 5A:
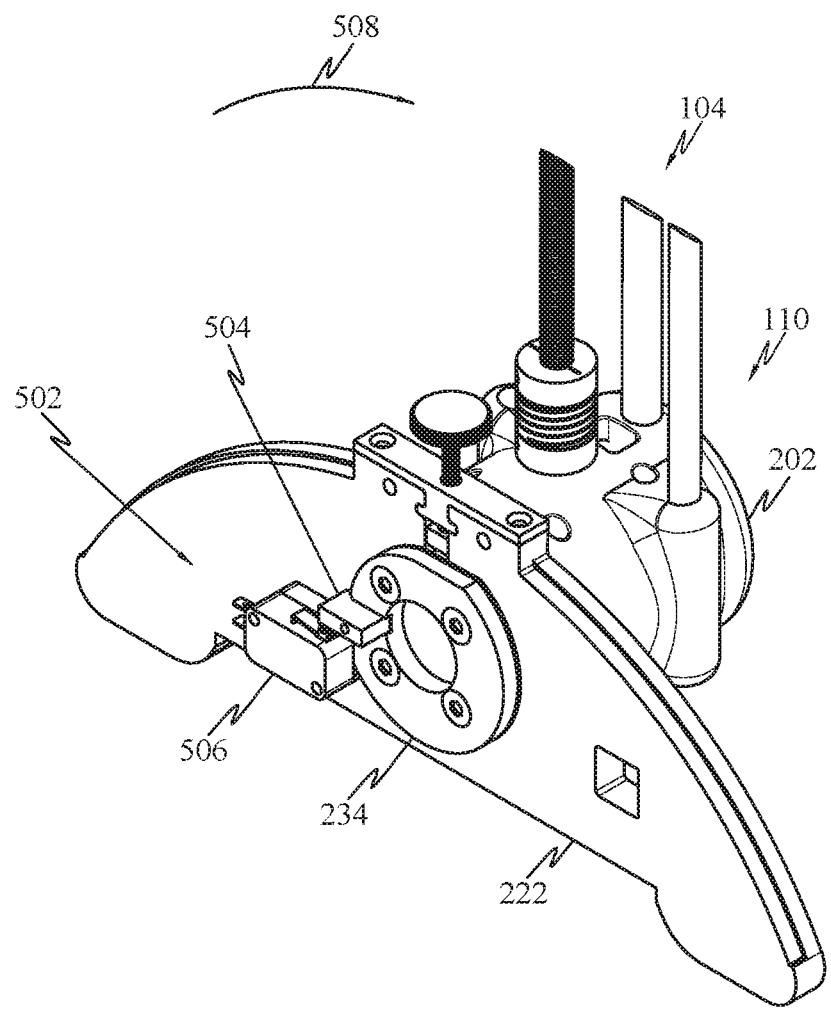
FIG. 5A illustrates an alternate embodiment of a sensor system 502 when the structure 104 is in the upright position 110.
Figure 5B:
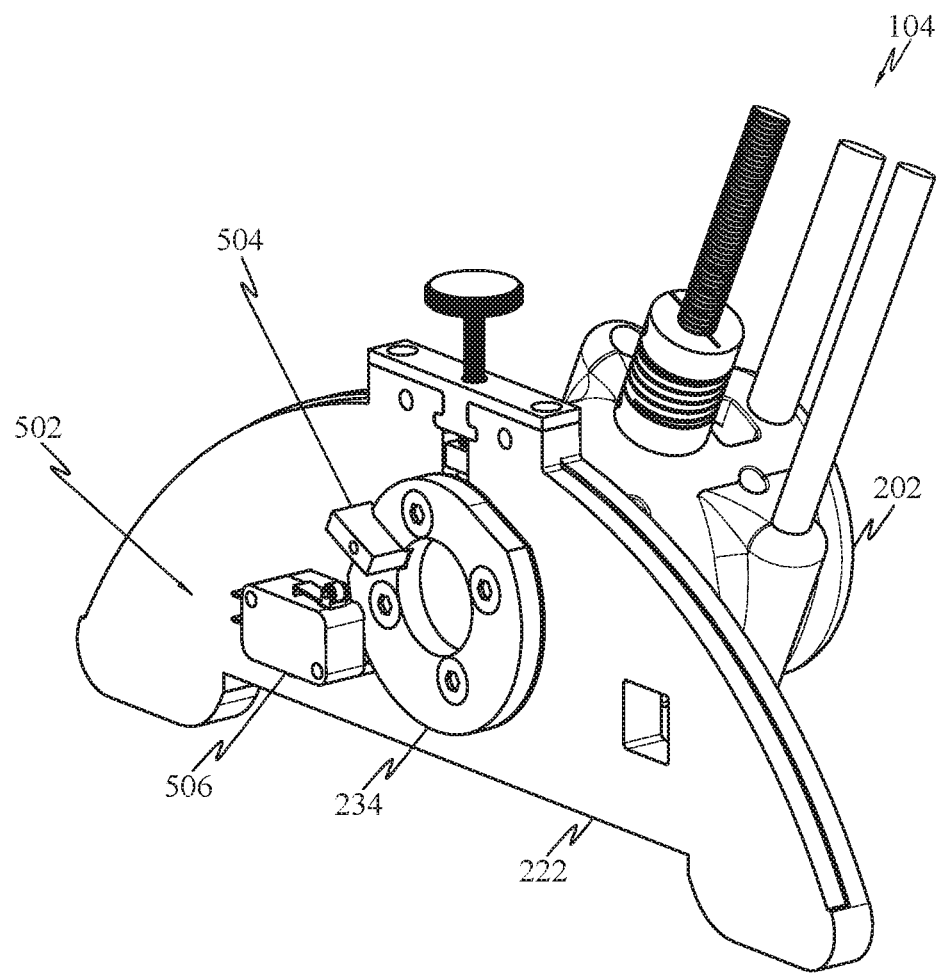
FIG. 5B illustrates working of the sensor system 502 when the structure 104 is in intermediate position, in accordance with an embodiment.

FIGS. 5A and 5B illustrate a sensor system 502 to sense whether the structure 104 is in the folded position 112 or the upright position 110, in accordance with an embodiment. The sensor system 502 may comprise a movable part 504 and a relay 506.

The movable part 504 may be fixed to the connecting member 234 using a dowel pin or any other equivalent mechanical fixture and is configured to rotate as the connecting member 234 rotates. The relay 506 may be fixed to the support plate 222 such that the relay 506 is in close proximity to the connecting member 234 and may contact the movable part 504 when the connecting member 234 rotates.

In another embodiment, the movable part 504 may be a protrusion on the connecting member 234.

Specifically referring to FIG. 5A, the structure 104 is in upright position 110. At this point, the movable part 504 may be in contact with the relay 506. As the movable part 504 is in contact with the relay 506, electrical circuit may be completed and power supply to the motor may be turned on.

Referring to FIG. 5B, as the hub 202 is rotated in clockwise direction 508 (refer FIG. 5A), the connecting member 234 rotates with the hub 202. This rotation of the connecting member 234 may result in the rotation of the movable part 504. As the movable part 504 rotates, it loses contact with the relay 506. This may result in an incomplete electrical circuit and the power supply to the motor may be cut off Thus, when the structure 104 is in a position other than upright position 110, the motor is turned off.

Figure 6A:
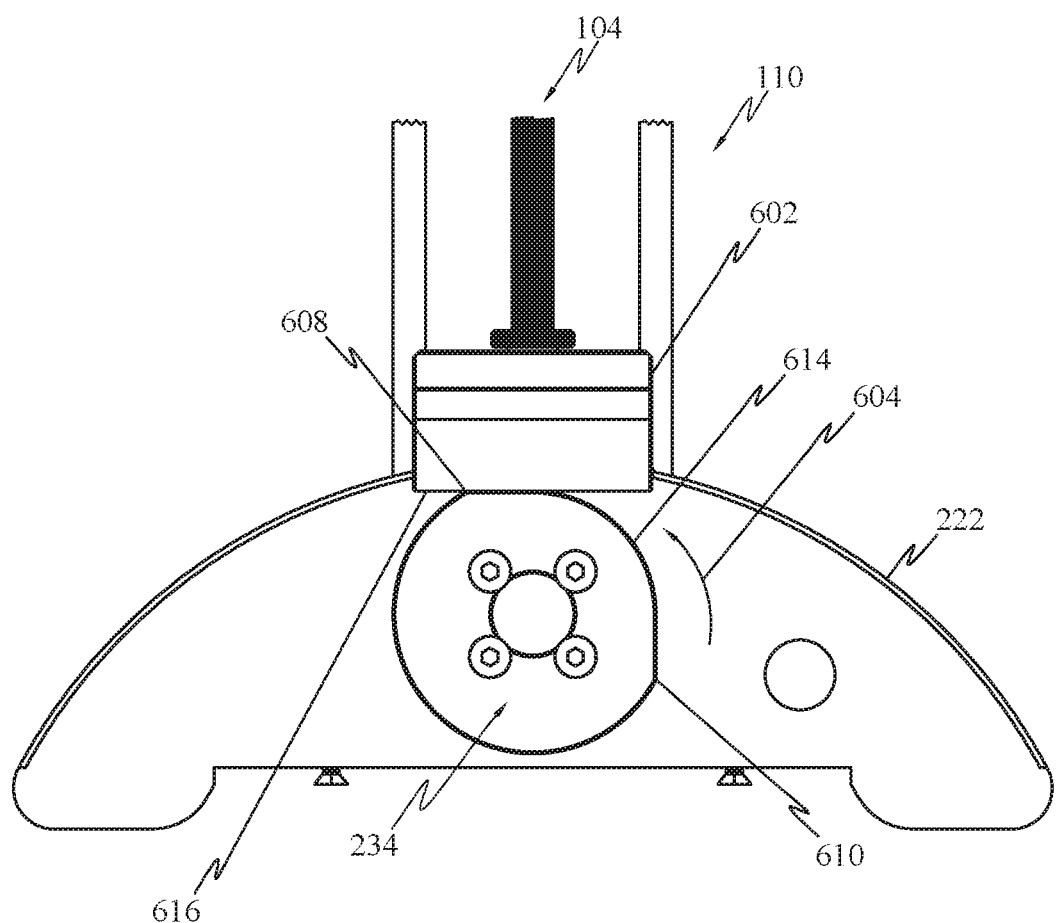
FIG. 6A is an alternate embodiment illustrating rotation of the structure 104, which is in the upright position 110, for it to assume the folded position 112.
Figure 6B:
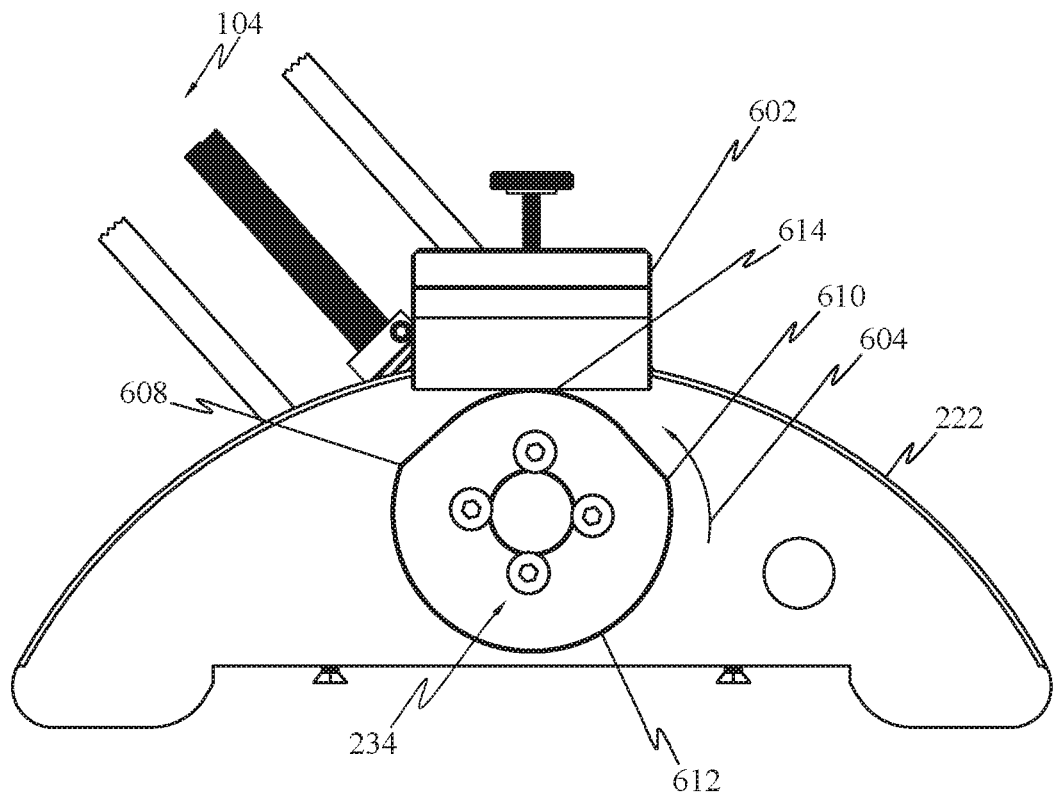
FIG. 6B is the alternate embodiment illustrating the intermediate position of the structure 104, when being rotated to assume the folded position 112.
Figure 6C:
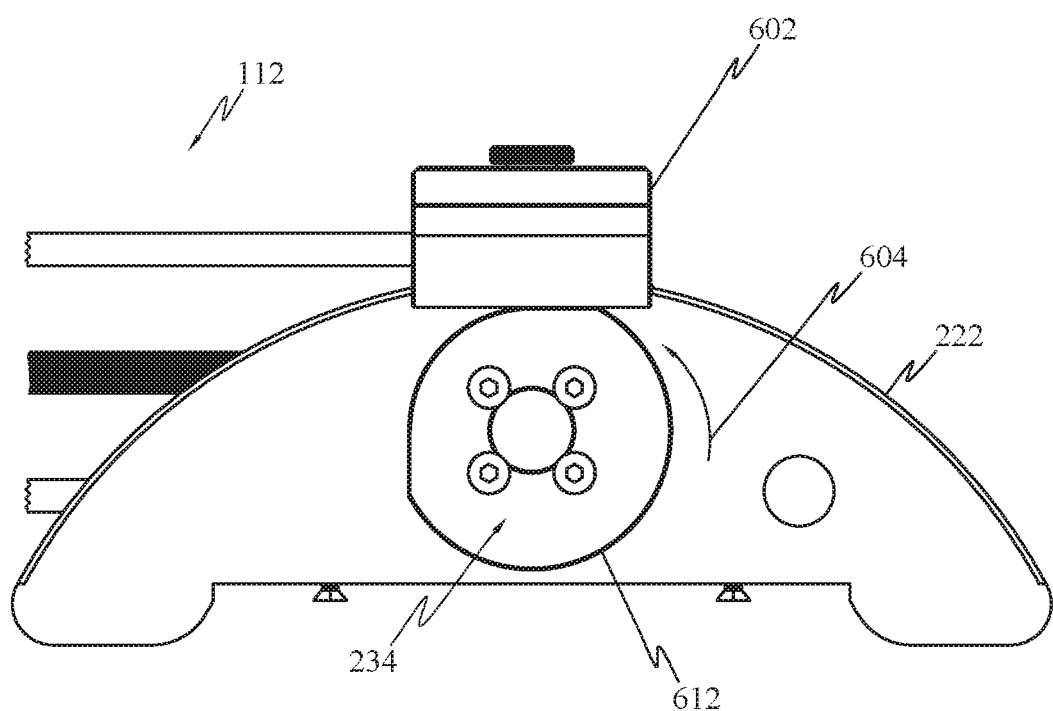
FIG. 6C is the alternate embodiment illustrating the structure 104 in the folded position 112.

FIGS. 6A, 6B and 6C illustrate folding of the structure 104, in accordance with an embodiment. The connecting member 234 may be in the shape of an eccentric cam with two profiles, first profile 612 and a second profile 614. A blocking member 602 may be fixed to the support plate 222 on one end and other end of the blocking member 602 may rest on the second profile 614 of the connecting member 234. The blocking member 602 may allow the second profile to rotate along its surface 616, whereas block the rotation of the first profile 612 along its surface 616.

In an embodiment, as the connecting member 234 is rotated in anti-clockwise direction 604, the second profile 614 of the support plate 234 rotates along the surface 616. At point 610 (where the first profile 612 and the second profile 614 meet) the rotation of the connecting member 234 in anti-clockwise direction 604 is blocked by the blocking member 602. At this point, the structure 104 is in folded position 112. When the blocking member 602 is in contact with the connecting member 234 at point 608, the structure 104 is in upright position 110.

It shall be noted that the processes described above are described as sequence of steps; this was done solely for the sake of illustration. Accordingly, it is contemplated that some steps may be added, some steps may be omitted, the order of the steps may be re-arranged, or some steps may be performed simultaneously.

Although embodiments have been described with reference to specific example embodiments, it will be evident that various modifications and changes may be made to these embodiments without departing from the broader spirit and scope of the system and method described herein. Accordingly, the specification and drawings are to be regarded in an illustrative rather than a restrictive sense.

Many alterations and modifications of the present invention will no doubt become apparent to a person of ordinary skill in the art after having read the foregoing description. It is to be understood that the phraseology or terminology employed herein is for the purpose of description and not of limitation. It is to be understood that the description above contains many specifications; these should not be construed as limiting the scope of the invention but as merely providing illustrations of some of the personally preferred embodiments of this invention. Thus, the scope of the invention should be determined by the appended claims and their legal equivalents rather than by the examples given.

What is claimed is:

1. A system provided in an additive manufacturing machine for operably rotating a structure, which enables movement of a print head of the additive manufacturing machine along a vertical axis, to assume a folded position or an upright position, the system comprising:
   a hub, wherein the hub at least partially supports the structure, the hub comprising a first member defining an arched surface and a plurality of notches; and
   a second member pressed against the first member by a tensioning member, wherein,
      the hub is operable to be rotated to assume the upright position or the folded position of the structure;
      rotation of the hub results in at least a portion of the arched surface sliding against the second member, which is enabled by retraction of the second member; and
      the second member is received by one of the plurality of notches to retain the structure in the folded position or the upright position.

2. The system of claim 1, wherein the first member defines a circular periphery, wherein the plurality of notches are defined by the periphery.

3. The system of claim 1, wherein a first of the plurality of notches, which retains the structure in the folded position, and a second of the plurality of notches, which retains the structure in the upright position, are spaced apart by over 45 degrees.

4. The system of claim 1, wherein a first of the plurality of notches, which retains the structure in the folded position, and a second of the plurality of notches, which retains the structure in the upright position, are spaced apart by over 45 degrees and under 120 degrees.

5. The system of claim 1, wherein the second member is cylindrical or spherical.

6. The system of claim 1, wherein the tensioning member is a spring, wherein the spring contracts when the arched surface slides against the second member, and the spring expands when the second member is received by one of the plurality of notches.

7. The system of claim 1, further comprising a support plate, which is stationary relative to the hub, the support plate defining a first through hole, wherein the support plate receives the first member within the first through hole, wherein the first member rotates within the first through hole.

8. The system of claim 7, wherein the support plate defines at least one groove extending from circumference of the first through hole, wherein the groove accommodates the second member and the tensioning member, such that the second member traverses within the groove.

9. The system of claim 8, further comprising a locking knob, wherein,
   the locking knob comprises at least a partially threaded shank;
   the support plate further defines a second through hole exposed to the groove; and
   the shank passes through the second through hole, such that rotation of the locking knob results in adjustment of force exerted by the tensioning member over the second member.

10. The system of claim 7, further comprising a block and a locking knob, the block is accommodated within the groove, the block interfaces with the tensioning member on one side and the second member on another side, to transfer force from the tensioning member to the second member, wherein force on the second member is operably adjustable using the locking knob.

11. The system of claim 1, wherein the hub encloses a motor, wherein the motor rotates with the hub.

12. The system of claim 11, further comprising at least one sensor, wherein the sensor senses whether the structure is in the folded position or the upright position.

13. The system of claim 12, further comprising a processor configured to receive input from the sensor, wherein the processor is configured to prevent operation of the motor when the structure is in the folded position.

* * * * *